Figure 1:
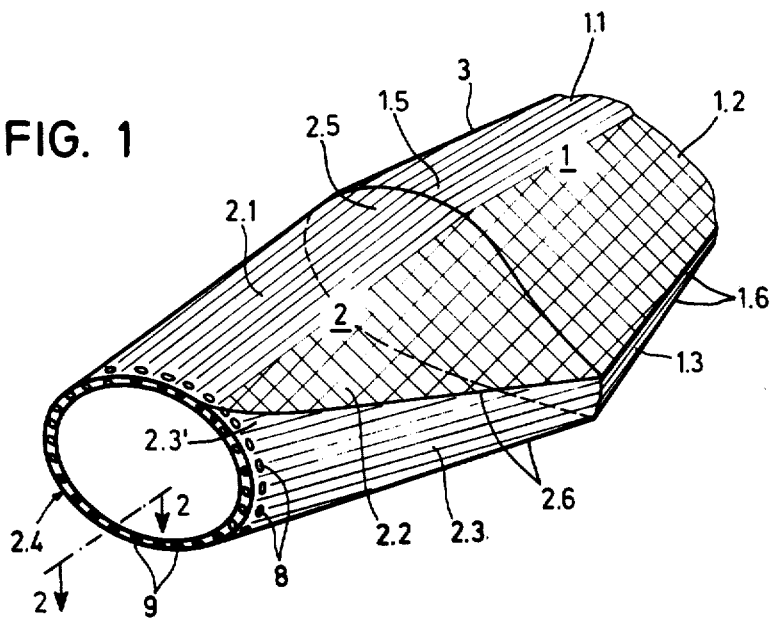

United States Patent [19]

Wackerle et al.

[11] 4,412,784
[45] Nov. 1, 1983

[54] MONOCOQUE TYPE ROTOR BLADE

[75] Inventors: Peter-Martin Wackerle; Michael Hahn, both of Ottobrunn, Fed. Rep. of Germany

[73] Assignee: Messerschmitt-Boelkow-Blohm GmbH, Munich, Fed. Rep. of Germany

[21] Appl. No.: 342,907

[22] Filed: Jan. 26, 1982

[30] Foreign Application Priority Data

Feb. 4, 1981 [DE] Fed. Rep. of Germany ....... 3103710

[51] Int. Cl.³ .................... B64C 27/46; B64C 27/48; B64C 11/26
[52] U.S. Cl. ............... 416/230; 416/229 R; 416/239; 416/248; 416/241 A
[58] Field of Search .............. 416/230 R, 230 A, 229, 416/239, 248, 241 A

[56] References Cited

U.S. PATENT DOCUMENTS 1,875,597  9/1932  Heath .................................. 416/230
4,242,160 12/1980  Pinter et al. ...................... 416/230 A

FOREIGN PATENT DOCUMENTS 2832098 of 0000 Fed. Rep. of Germany .
3014347 of 0000 Fed. Rep. of Germany .

Primary Examiner—Stephen Marcus
Assistant Examiner—John Kwon
Attorney, Agent, or Firm—W. G. Fasse; D. H. Kane, Jr.

[57] ABSTRACT

The present rotor blade is constructed as a so-called monocoque or shell type blade for use in large fans and windmill rotors. For this purpose the blade is made of fiber reinforced synthetic material with a differnt orientation of the fibers in different sections of the blade. The transition between the blade proper and the connecting end of the blade is formed by a blade root section which has a connecting end of circular or elliptical cross-section and a wing facing end corresponding in cross-section to the blade cross-section. The blade root section has three zones. In the main leading edge zone including the leading edge and adjacent sides of the blade root section the reinforcing fibers extend in parallel to one another. The fibers also extend unidirectionally in a rear zone forming the trailing edge of the blade root section and in this trailing edge zone the fibers also extend in parallel to one another but at an angle relative to the fibers in the leading edge zone. An intermediate zone is located between the leading and trailing edge zones. The fibers in the intermediate zone are arranged in a cross-over relationship relative to one another. The connecting end is formed only by unidirectionally extending fibers.

9 Claims, 2 Drawing Figures

MONOCOQUE TYPE ROTOR BLADE

CROSS-REFERENCE TO RELATED APPLICATION

The present application corresponds to German patent application No. P 31 03 710.0, filed in the Federal Republic of Germany on Feb. 4, 1981. The priority of said German filing date is hereby claimed for the present application.

BACKGROUND OF THE INVENTION

The present invention relates to a monocoque type rotor blade which comprises a shell manufactured of fiber reinforced synthetic material. The reinforcing fibers extend at least in the zone of the leading edge of the blade unidirectionally in the longitudinal direction of the blade. The fiber strands extend out of the blade proper and into the blade root.

Rotor blades of this type, for example, as disclosed in German patent publication (DE-OS) No. 30 14 347 are preferably connected to a rotor hub in a hingeless manner by means of so-called tension bolts which are subject to tension loads only. However, heretofore, it has been necessary to limit the monocoque type construction to the blade shell proper if it was desired to avoid additional hardware for the blade root. Thus, the blade shell proper was constructed to comprise a support core between two cover skins which support core is soft relative to tension forces or loads. The cover skins were constructed of fiber reinforced synthetic material. In this connection reference is made to German Patent Publication (DE-OS) No. 2,832,098. Additionally, it is necessary to employ for the rotors of large scale wind energy collecting windmills a flange type bearing adapter which must conform to the blade angle bearing. Such adapter is necessary because the blades for such large scale rotors require an adjustability of the pitch angle of the rotor blades and because of the wing profile of the blade root section. Besides, this type of prior art construction is rather heavy which is undesirable for lightweight structures.

OBJECTS OF THE INVENTION

In view of the above it is the aim of the invention to achieve the following objects singly or in combination:

to provide a rotor blade of the type mentioned above for a hingeless connection to the rotor hub, whereby the rotor blade is to be constructed in such a manner that a direct connection may be accomplished between the blade or shell root and a blade angle bearing directly by means of a tension bolt connection;

to simplify the construction of rotor blades for use in large scale fans and windmills while simultaneously satisfying the requirement of an aerodynamic construction even of the blade root section; and to connect each blade root section with its connecting end to a respective rotor hub flange by means of a plurality of tension loaded bolts for increased safety.

SUMMARY OF THE INVENTION

According to the invention there is provided a monocoque rotor blade especially for large scale fans and windmills, wherein the blade root section has a radially inner connecting end having a circular or elliptical shape which is constructed of unidirectionally extending fiber strands. The strands of the leading and trailing edges are so located that they come together substantially at the connecting end of the blade root section while a gusset type zone in which the reinforcing fibers are arranged in a cross-over relationship is located between the leading and trailing edge zones. Thus, the connecting end is formed by fiber strands which in turn form exclusively supporting blade zones subject to tension forces. This type of structure assures that the transition formed by the blade root between the wing section of the blade and the connecting end of the blade root section has a bending stiffness which is undiminished relative to the strength of the wing section of the blade.

The stiffness of the rotor blade relative to lead-lag movements may even be increased by merely extending the unidirectionally running fiber strands forming the curved surface of the trailing edge of the blade root section, into the trailing edge of the wing section proper of the blade. Preferably, the trailing edge zone of the blade root section has a width which increases from the interface between the root section and the wing section to the connecting end of the root section. In other words, the fiber strands forming the trailing edge zone of the blade root taper toward the trailing edge of the wing section in the radial, outward direction. Due to this tapering it is possible to splice certain unidirectional fiber strands of the trailing edge zone with the fiber strands of the intermediate zone, whereby longitudinal forces resulting due to the blade connection may be introduced through the intermediate zone having a crosswise fiber orientation, into the unidirectionally extending fibers which form the leading edge of the blade shell construction. Thus, the intermediate zone with its crosswise fiber orientation is subjected to shearing loads which are taken up as longitudinal loads by the leading edge of the rotor blade which leading edge performs the function of a support spar.

The present rotor blade is simple in its structure and satisfies simultaneously the requirement that the blade root section has a flow dynamically advantageous contour. This flow dynamically advantageous contour is achieved due to the width of the curved surface of the trailing edge zone of the blade root section which width is relatively large compared to the profile depth of the wing section. The contour of the blade root section may be further improved in a flow dynamic sense by providing edge type transitions between the intermediate zones and the zone forming the trailing edge of the blade root section.

Another advantage of the invention is seen in that the fibers are utilized so as to exploit the fiber characteristics in an optimal manner. Another advantage is seen in that the connecting bolts for the blade connection may be subjected to a biasing without any problems to assure a uniform minimum stiffness of the blade connection during its operation. By providing a substantial number of tension loaded connecting bolts for each blade it is possible to provide a substantial safety factor.

BRIEF FIGURE DESCRIPTION

Figure 2:
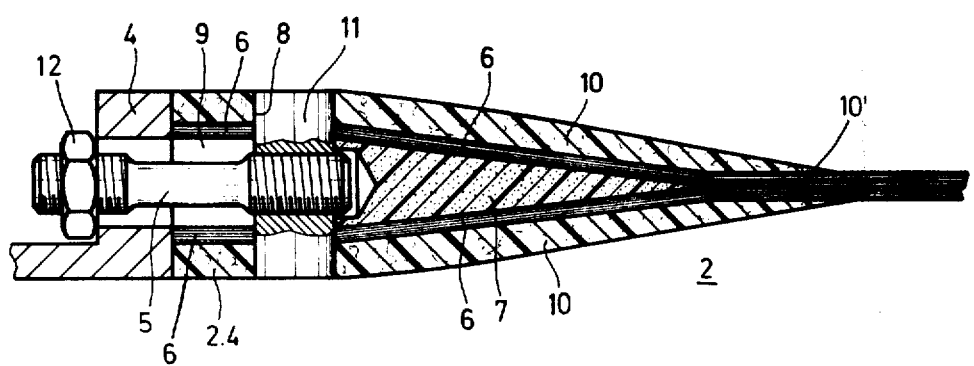

In order that the invention may be clearly understood, it will now be described, by way of example, with reference to the accompanying drawings, wherein:

FIG. 1 is a perspective view of the connecting end of a rotor blade showing the root section and a short portion of the wing section of a rotor blade according to the invention; and FIG. 2 is a sectional view through the blade root section along section line 2—2 in FIG. 1 illustrating a single tension bolt for connecting the wing to a rotor hub flange.

DETAILED DESCRIPTION OF PREFERRED EXAMPLE EMBODIMENTS AND OF THE BEST MODE OF THE INVENTION

FIG. 1 shows a partial, perspective view of a rotor blade according to the invention having a wing or blade section 1 and a root section 2. Both sections are constructed of fiber reinforced synthetic material. The wing section 1 has a leading edge zone 1.1 forming a support spar 3, two intermediate zones 1.2 and a trailing edge 1.3. The fibers in the leading edge zone 1.1 and in the trailing edge zone 1.3 extend unidirectionally substantially in parallel to the longitudinal direction of the blades. The fibers in the intermediate zones 1.2 extend in a cross-over relationship. The wing section 1 has a radially inner end 1.5 having a given cross-sectional profile or area. Similarly, the root section 2 has a radially outer end 2.5 with the same cross-sectional area so that both sections may merge smoothly into each other. The root section 2 also has a leading edge zone 2.1, two intermediate zones 2.2 and a trailing edge zone 2.3. Further, the root section 2 has a connecting end 2.4 which is secured to a rotor hub member 4 as will be explained in more detail below with reference to FIG. 2.

Referring further to FIG. 1, the connecting end 2.4 has a circular or elliptical configuration and the zones 2.1, 2.2, and 2.3 are so shaped that the contour surface of the root section 2 may be projected into a flat or two-dimensional plane when the contour surface of the root section 2 is unrolled. This feature of the invention has the advantage that the manufacturing is simplified because the laminating molds may be assembled from a plurality of individual mold surface components, for example, the mold surface components may comprise one component for the leading edge zone 2.1, another component for the two intermediate zones 2.2 and still another component for the trailing edge zone 2.3.

The fiber orientation in the root section 2 is the same as the fiber orientation in the wing section 1. To illustrate the fiber orientation the longitudinal lines in the leading edge zones 1.1 and 2.1 indicate the unidirectional extension of the reinforcing fibers in these zones. The same applies to the unidirectional extension of the fibers in the trailing edge zones 1.3 and 2.3. The fibers in the intermediate zones 2.2 also extend in a crossover relationship as in the zones 1.2 of the wing section. The intermediate section 2.2 form gussets between the leading and trailing edge zones. Further, the flow dynamic characteristics of the roots and wing section may be improved by providing an edge type transition 1.6 and another edge type transition 2.6 between the intermediate zones 1.2, 2.2 on the one hand and the respective trailing edge zones 1.3 and 2.3 on the other hand.

Due to the arrangement of the unidirectionally extending fibers in the zone 2.1 these fibers form approximately two thirds of the circumference constituting the connecting end 2.4 of the root section 2. The remaining one third is formed by the curved extensions 2.3' of the trailing edge zone 2.3 reaching with its extensions 2.3' substantially to the leading edge zone 2.1 at the connecting end 2.4 so that the gussets 2.2 of fibers arranged in a crosswise formation do not reach into the connecting end 2.4. Thus, the connecting end 2.4 itself is completely formed by unidirectionally and hence homogeneously extending fiber strands.

The intermediate zones 2.2 may be formed as part of an outer blade envelope only partly shown at the zones 2.2. In other words, the outer blade envelope and the intermediate gussets 2.2 will have the above mentioned crosswise fiber orientation which is very effective for a force transmission from the trailing edge zone 2.3 into the leading edge zone 2.1 forming the supporting spar of the blade structure. The force transmission subjects the gussets 2.2 to shearing loads which are taken up well by the crosswise fiber orientation. The outer envelope of which the gussets 2.2 form a part, will enclose the leading and trailing edges of the entire blade structure.

Since the trailing edge zones 2.3 have a curved shape with extensions 2.3', the width of the trailing edge zone 2.3 increases from the radially outer end 2.5 to the connecting end 2.4. Thus, the fiber strands of the trailing edge zone 2.3 which end at points radially inwardly of the root end 2.5 are spliced into the gussets 2.2, thereby improving the force transmission from the trailing edge zones 2.3 into the leading edge zones 2.1. Additionally, the fibers which extend unidirectionally along the entire length of the trailing edge zone 2.3 and thus into the trailing edge zone 1.3 of the wing section 1, contribute to the overall blade stiffness in the lead-lag direction of the blade.

Incidentally, the above mentioned subdivision of the blade root into several zones as described does not depend on the particular number of zones for its operability. Thus, the number of zones may be larger or smaller and the teaching of the invention will be satisfied as long as longitudinally extending, unidirectional fiber strands form the connecting end 2.4 substantially entirely.

FIG. 2 shows a sectional view along section line 2—2 in FIG. 1. The flange 4 may have the shape of a circular ring or disk and it may form a radially outer portion of a bearing. The connecting end 2.4 of the root section 2 is connected to the flange 4 by a plurality of tension bolts 5, only one of which is shown in FIG. 2. Each bolt extends in an opening 9 which is formed by a respective spacing between two fiber strand layers 6 arranged one above the other. Preferably, each layer 6 has the same thickness. The radially outer ends of the fiber layers 6 merge into each other in a zone 10' and the wedge shaped spacing is filled with a filler member core 7, for example, made of a foam synthetic material. The tension bolts 5 are secured in threaded holes of respective locking members 11 extending through cross-bores 8. The longitudinal axis of these cross-bores 8 extends substantially perpendicularly to the longitudinal axis of the tension bolts 5. The openings 9 may be formed as longitudinally extending bores in the filler cores 7.

Due to the cross-bores 8 it is desirable to reinforce the root section 2 in the zone of the layers 6 by cover layers 10 having a crosswise fiber orientation. The cover layers 10 preferably end in the zone 10' outside the core 7. The cover layers 10 have a cross-over fiber orientation. If necessary, a plurality of such fiber layers may be used as reinforcements, whereby layers with a unidirectional fiber orientation may alternate with layers of a crosswise fiber orientation. The fiber orientation in the unidirectional layers may extend in the longitudinal direction of the blade or in a direction extending across the longitudinal blade direction. By a proper combination of these reinforcing layers 10 with glass fibers and carbon fibers the root section 2 may be provided with a thermal expansion coefficient or characteristic corresponding to that of the connecting flange 4 which is normally made of metal. Providing the root section 6 and the flange 4 with the same thermal expansion characteristic has the advantage that a uniform stiffness of the blade connection is assured in operation.

The connection between the connecting end 2.4 of the root section 2 and the flange 4 by means of the locking members 11 in the cross-bores 8 and by means of the respective tension bolts 5 has the advantage that the tension bolts 5 may be biased by adjusting the respective nut 12. For this purpose it is preferable to use tension bolts 5 of the so-called necked-down type with a reduced diameter section intermediate the threaded ends as shown in FIG. 2. Thus, the locking members 11 merely require a threaded hole without any need for further locking means.

Although the invention has been described with reference to specific example embodiments, it will be appreciated, that it is intended, to cover all modifications and equivalents within the scope of the appended claims.

What is claimed is:

1. A rotor blade constructed as a shell or monocoque, comprising a root section (2) and a wing section (1) having a wing tip and a wing end (1.5) with a given cross-section connected to said root section (2), each of said sections (1, 2) having a leading edge zone (1.1; 2.1), a trailing edge zone (1.3; 2.3) and two intermediate zones (1.2; 2.2) connecting the leading and trailing edge zones, said intermediate connecting zones (1.2; 2.2) comprising reinforcing fibers extending in a cross-over relationship relative to one another, said leading and trailing edge zones each comprising reinforcing fibers extending unidirectionally and substantially in parallel to one another in each respective leading edge and trailing edge zone, said root section (2) having a connecting end (2.4) of substantially circular or elliptical cross-section for securing the rotor blade to a rotor hub, and a radially outer end (2.5) connected to said wing end (1.5) and having a cross-section corresponding to said given cross-section, said trailing edge zone (2.3) of said root section having curved extensions (2.3') at said connecting end (2.4), said curved extensions (2.3') reaching substantially toward said leading edge zone (2.1) of said root section (2) at said connecting end (2.4), whereby said intermediate zones (2.2) of the root section (2) form gussets between the leading edge zone and the trailing edge zone.

2. The rotor blade of claim 1, wherein said root section has a sheered contour forming a three-dimensional surface which may be projected into a two-dimensional plane.

3. The rotor blade of claim 1, wherein the fibers extending unidirectionally in said trailing edge zone (2.3) of said root section pass on without interruption into the trailing edge zone (1.3) of the wing section.

4. The rotor blade of claim 1 or 3, wherein said trailing edge zone (2.3) of said root section has a width that increases from said radially outer end (2.5) of the root section toward said connecting end (2.4) of said root section.

5. The rotor blade of claim 1 or 3, wherein said intermediate connecting zone (2.2) with the cross-over relationship of fibers forms part of an external blade envelope.

6. The rotor blade of claim 1, further comprising edge type transitions (1.6; 2.6) between the intermediate connecting zones (1.2; 2.2) and the trailing edge zones (1.3; 2.3).

7. The rotor blade of claim 1, further comprising in said connecting end (2.4) of said root section (2) a plurality of cross-bores (8) and a locking member (11) in each of said cross-bores, each locking member (11) having a threaded hole therein extending substantially in parallel to the longitudinal axis of the rotor blade, and longitudinal openings (9) in said connecting end (2.4) of said root sections, for receiving a threaded bolt (5) in each of said longitudinal openings (9), said threaded bolts being adapted for engaging the threaded hole of the respective locking member (11).

8. The rotor blade of claim 7, wherein said unidirectional fiber strands are formed into two layers (6) having a spacing therebetween, core filler means (7) located in said spacing so as to leave said opening (9) between said fiber strand layers (6) for providing access for said threaded bolts (5) to the respective locking members (11).

9. The rotor blade of claim 8, wherein said root section (2) further comprises cover layers (10) of fiber reinforced synthetic material, said cover layers being located substantially in the range of said core filler means (7), and also covering said unidirectional fiber strands in a zone (10') outside said core filler means (7).

* * * * *